(12) United States Patent
Scheidt et al.

(10) Patent No.: US 12,390,778 B2
(45) Date of Patent: Aug. 19, 2025

(54) LUBRICATED MIXING DEVICE FOR REACTION PLASTICS AND METHOD FOR GENERATING REACTION PLASTICS

(71) Applicant: WHIRLPOOL CORPORATION, Benton Harbor, MI (US)

(72) Inventors: Ernst Scheidt, Dachau (DE); Ralf Moser, Munich (DE); Gilberto Fischer, Santa Catarina (BR)

(73) Assignees: Kraussmaffei Technologies GMBH (DE); Whirlpool Corporation, Benton Harbor, MI (US)

( * ) Notice: Subject to any disclaimer, the term of this patent is extended or adjusted under 35 U.S.C. 154(b) by 561 days.

(21) Appl. No.: 17/766,160

(22) PCT Filed: Oct. 7, 2020

(86) PCT No.: PCT/EP2020/078093
§ 371 (c)(1),
(2) Date: Apr. 1, 2022

(87) PCT Pub. No.: WO2021/069483
PCT Pub. Date: Apr. 15, 2021

(65) Prior Publication Data
US 2022/0370972 A1    Nov. 24, 2022

(30) Foreign Application Priority Data

Oct. 11, 2019  (WO) ................. PCT/EP2019/077601

(51) Int. Cl.
*B01F 35/12*    (2022.01)
*B01F 23/40*    (2022.01)
(Continued)

(52) U.S. Cl.
CPC ............ *B01F 35/122* (2022.01); *B01F 23/43* (2022.01); *B01F 23/47* (2022.01); *B01F 23/49* (2022.01);
(Continued)

(58) Field of Classification Search
CPC .. B01F 31/65; B01F 35/11; B01F 2101/2805; B29C 67/246; B29B 7/806; B29B 7/668; C08G 18/08
See application file for complete search history.

(56) References Cited

U.S. PATENT DOCUMENTS 3,239,100 A    3/1966 Peterson
3,687,370 A    8/1972 Sperry
(Continued)

FOREIGN PATENT DOCUMENTS

DE    2612812 C3    9/1977
DE    4214404 A1    11/1993
(Continued)

OTHER PUBLICATIONS

Machine-generated English language translation of DE 102015112445A1, 14 pages, retrieved from ESPACENET on Nov. 27, 2024. (Year: 2017).*
(Continued)

*Primary Examiner* — Fred M Teskin
(74) *Attorney, Agent, or Firm* — Finnegan, Henderson, Farabow, Garrett & Dunner LLP (57) ABSTRACT

A mixing device and method for generating reaction plastic, the mixing device including: a mixing chamber configured to mix reactive components to generate the reaction plastic; a discharge unit, including a discharge pipe connected to the mixing chamber configured to discharge the reaction plastic generated in the mixing chamber; a cleaning piston that is axially aligned with the discharge pipe of the discharge unit
(Continued)

and is moveable into the discharge pipe to clean reaction plastic from the discharge pipe; a fluid supply device configured to provide a lubricant into the discharge unit via an outlet to lubricate the discharge unit, a control piston arranged within the mixing chamber and configured to control flow of the reactive components; wherein an axial direction of the control piston is oblique to an axial direction of a discharge pipe of the discharge unit.

16 Claims, 3 Drawing Sheets (51) Int. Cl.
  B01F 23/43 (2022.01)
  B01F 23/47 (2022.01)
  B01F 31/65 (2022.01)
  B01F 35/11 (2022.01)
  C08G 18/08 (2006.01)
  B01F 101/00 (2022.01)
(52) U.S. Cl.
  CPC .............. *B01F 31/65* (2022.01); *B01F 35/11* (2022.01); *C08G 18/08* (2013.01); *B01F 2101/2805* (2022.01)

(56) References Cited

U.S. PATENT DOCUMENTS

| | | |
|---|---|---|
| 3,802,605 A | 4/1974 | Standlick |
| 9,822,881 B2 | 11/2017 | Witte et al. |
| 2004/0257908 A1 | 12/2004 | Breuker et al. |
| 2010/0112217 A1 | 5/2010 | Pawlik et al. |

FOREIGN PATENT DOCUMENTS

| | | |
|---|---|---|
| DE | 102015112445 A1 | 2/2017 |
| EP | 1992465 A2 | 5/2008 |
| EP | 2233268 A2 | 9/2010 |
| JP | 05220768 | 8/1993 |
| WO | WO 98/28086 A1 | 7/1998 |
| WO | WO 2013/147368 A1 | 10/2013 |

OTHER PUBLICATIONS

PCT International Search Report and Written Opinion of the International Searching Authority received in PCT/EP2020/078093, mailed Dec. 3, 2020.

* cited by examiner

LUBRICATED MIXING DEVICE FOR REACTION PLASTICS AND METHOD FOR GENERATING REACTION PLASTICS

This application is an US National Stage Filing International Application No. PCT/EP2020/078093, filed on Oct. 7, 2020, which application claims priority from International Application No. PCT/EP2019/077601, filed on Oct. 11, 2019. The entire contents of the aforementioned applications are incorporated herein by reference.

TECHNICAL FIELD

The present invention concerns mixing devices that are used for generating reaction plastics. In particular, the present invention concerns lubrication of discharge components of such mixing devices.

BACKGROUND

It is common practice in the field of reaction plastic processing to use mixing heads such as transfer mixing heads/L-shaped mixing heads to mix the different components of a reaction plastic. In such mixing heads the reaction plastic, e.g. polyurethane, PUR, is output from a mixing chamber via discharge components like discharge pipes for further processing. For example, the reaction plastic might be filled directly into hollow profiles such as window frames or refrigerator housings.

The reaction plastic is usually pressed out of a discharge unit comprising and/or ending in a discharge pipe by freshly mixed reaction plastic supplied from the mixing chamber. So, once generation of reaction plastics is stopped, there will remain a rest of reaction plastic in the discharge pipe. This remaining plastic has to be removed in order to prevent plugging of the discharge pipe. To this end, mixing heads are often provided with a cleaning piston that is axially aligned with the discharge pipe and can be moved with a positive fit into the discharge pipe. In this manner the remaining reaction plastic is pressed out of the discharge pipe by the cleaning piston.

Although this will lead to removal of the principle part of the remaining plastic, it is inevitable that a small amount of the plastic adheres to the walls of the discharge pipe, since construction-conditioned there is a small clearance between the inner wall of the discharge pipe and the outer wall of the cleaning piston. Such an adherence of plastics occurs in particular for strongly expanding and adhesive reaction plastics, as for example PUR foams.

The reaction plastic adhering to the inner wall of the discharge pipe will harden and will thus tighten the discharge pipe. This leads in turn to high friction between the cleaning piston and the wall of the discharge pipe. Due to the enhanced friction, wearing of the cleaning piston is increased, which reduces the lifetime of the cleaning piston, and, if for example the cleaning piston is fretting and stuck in the discharge pipe, also the lifetime of the entire mixing head.

To solve this problem it had been envisaged to provide a lubricant to reduce the friction between discharge pipe and cleaning piston. There are various constructions for lubricating the cleaning piston known from the prior art that do, however, lead to different problems.

Mixing heads with cleaning pistons are for example provided with a spacer part or bell jar to separate the cleaning piston from a hydraulic driving of the cleaning piston. By closing this bell jar and filling it with lubricant it is possible to provide a so called "static" lubrication of the piston from the bell jar side. However, the problem with this type of lubrication is that the lubricant must be pressed through the clearance between cleaning piston and discharge pipe, so that it is difficult to provide a sufficient amount of lubricant into the cleaning piston. In addition, due to the movements of the cleaning piston, reaction plastic will also move into the bell jar and lead to a deterioration of the lubricant contained in the bell jar. To prevent this, frequent maintenance and exchange of the lubricant is necessary, which leads to shut down times of the mixing head and to additional cost and effort.

As an alternative it was also considered to provide a circulation of lubricant through the bell jar. However, also in this case, the lubricant must pass through the clearance between discharge pipe and cleaning piston. Further, circulating systems either need also a lot of maintenance or are very expensive and need a lot of space due to the presence of a pump for circulation the lubricant and a filtering system to keep the pump clean of reaction plastic that had moved into the bell jar.

A further alternative was presented in DE 10 2015 112 445 A1 in which lubricant was injected via a specific duct into the clearance between cleaning piston and discharge pipe. However, also in this case there is the problem of correct dosage of lubricant through the clearance.

In addition to these problems connected to the presence of a cleaning piston, lubrication of the discharge pipe might also be advantageous in mixing heads that do not contain such a cleaning piston, like e.g. linear mixing heads. Here, lubricating discharging components before generating and discharging the reaction plastic might lead to an improved flow of the reaction plastic. Further, also in this case adherence of the reaction plastic to the inner wall of discharging components will be reduced, if not prevented.

SUMMARY

The present invention has therefore the object to provide a mixing device for reaction plastics containing discharging components that allows simple, cost sensitive and efficient lubrication of the discharging components. Another object is a method for generating reaction plastics with efficient lubrication of the discharging components. This problem is solved by the claimed subject-matter.

For example, a mixing device for generating reaction plastic may comprise a mixing chamber for mixing reactive components to generate the reaction plastic, a discharge unit connected to the mixing chamber for discharging the reaction plastic generated in the mixing chamber, and a fluid supply device for providing a lubricant into the discharge unit via an outlet in order to lubricate the discharge unit.

With regard to the mixing chamber and the discharge unit the mixing device is constructed as known from the prior art. Various forms of mixing heads containing a mixing chamber and a discharge unit are known to a skilled person such as e.g. linear mixing heads or L-shaped mixing heads. A detailed description of these parts of the mixing device can therefore be omitted here. Here, any combination of ducts, chambers, pipes and the like which the reaction plastic passes before being output from the mixing device may be considered to be a discharge unit.

To lubricate the discharge unit, a fluid lubricant, i.e. a gaseous or liquid lubricant or a mixture thereof, is directly fed into the discharge unit via the outlet of a fluid supply device. In particular, the lubricant is not provided through a clearance between other components of the mixing device into the discharge unit, like e.g. a clearance between a cleaning piston and a discharge pipe as described above. The lubricant is in particular also not provided from a spacer part side into the discharge unit.

Since the lubricant is directly provided onto the inner walls of the discharge unit, the lubricant is directly placed onto the areas that need lubrication, instead of providing it indirectly to these areas, as e.g. by feeding it through the clearance between a discharge pipe and a cleaning piston provided to clean the discharge pipe. This eases correct dosing of the amount of lubricant provided into the discharge unit, since there are no uncertainties like a clogging of such a clearance by reaction plastic or the dependency of the movement of lubricant through the clearance on the movement of the cleaning piston. Accordingly, the amount of lubricant can be controlled in an easy manner, since it can be fed directly into the discharge unit.

Providing fluid lubricant directly into the discharge unit of a mixing device for reaction plastics allows therefore easy, effective and cost-sensitive lubrication of the discharge unit.

The fluid supply device may comprise a gas supply device for providing gas together with the lubricant via the outlet into the discharge unit. This leads to an improved distribution of the fluid lubricant and thereby to an improved lubrication, since the lubricant is spread via the gas onto all inner parts of the discharge unit.

To distribute the lubricant via a gas supply device into the discharge unit is in addition particularly cost sensitive, if the mixing device must comprise anyhow a gas supply for the discharge components. This is e.g. the case for the mixing of reaction plastics containing an easily inflammable component, like pentane, where a gas supply for inerting must be provided. In this case it is sufficient to supply lubricant and gas in such a manner that the gas can spread the lubricant with its flow. It is therefore not necessary to redesign the main components of the mixing device like mixing chamber, discharge unit and the like. Instead it is possible to retrofit existing mixing devices having a gas supply by adding a supply for a lubricant. In addition, the supply of lubricant does not need a lot of maintenance and might be constructed space saving. Only small amounts of lubricant need to be actually provided into the discharge unit. These amounts might be fed into the discharge unit automatically via a piping. Due to this, there is also no risk that reaction plastic will be introduced into a reservoir of the lubricant contained outside the mixing device. Frequent exchange or cleaning of the lubricant via expensive filter systems is therefore not necessary.

The gas supplied from the gas supply device may be an inerting gas, preferably nitrogen. Thus, the mixing device may be used to process pentane driven reaction plastic foams, which need inerting of the components into which the foams are filled. Here, using nitrogen is most cost-sensitive.

The fluid supply device may comprise a lubricating device for providing the lubricant, the lubricating device being connected to the gas supply device. In this manner the fluid lubricant can be provided from the lubricating device into the gas flowing through the gas supply device or vice versa. Thus, a mixture of gas and lubricant can be achieved in an easy manner that guarantees that the gas flow carries the lubricant onto all components of the discharge unit that it passes.

Here, the fluid supply device may be configured to provide the lubricant from the lubricating device as nebulized lubricant comprised in the gas from the gas supply device. The lubricating device containing the lubricant is connected to the gas supply device, through which gas can be provided into the discharge unit, e.g. for inerting the discharge pipe and components to be filled with reaction plastics, or for cleaning the discharge pipe with pressurized gas. The gas can flow through the lubricating device and carry nebulized lubricant, i.e. small droplets of lubricant, via the outlet of the fluid supply device into the discharge unit. This ensures a complete wetting of the inner walls of the discharge unit without forming puddles of lubricant inside the discharge unit. Further, by controlling the flow of the gas carrying the nebulized lubricant into the discharge pipe, dosage of the lubricant can be controlled in an easy manner via control of the gas flow.

The lubricating device may comprise a, preferably pneumatic and/or hydraulic, valve that allows, in an open state, the gas to nebulize the lubricant and carry the nebulized lubricant with the gas flow into the discharge unit.

This allows the mixing device to use the gas supply device for two different functions. For a closed valve only the gas will flow into the discharge unit, e.g. for cleaning or inerting the discharge unit or components provided at the end of the discharge unit. If the valve is opened, the gas will flow through or across the lubricant. In this manner the gas flow will drag droplets of lubricant with it and helps therefore in forming the nebulized lubricant.

The lubricating device may to this end comprise an oiler comprising the lubricant, through which the gas flows to generate the nebulized lubricant. In this manner the lubricant can be nebulized in a simple, cost efficient, and effective manner. The oiler may be provided directly adjacent to the discharge unit. The oiler may also be arranged spaced apart from the discharge unit, such that the nebulized lubricant is carried through a piping to the discharge pipe. The lubricant may, however, also be nebulized in a different manner, e.g. by heating and vaporizing the lubricant. The gas flow will then carry the nebulized lubricant with it, without helping to generate it.

The mixing device may further comprise a cleaning piston that is axially aligned with a discharge pipe of the discharge unit and that is moveable into the discharge pipe to clean the discharge pipe from reaction plastic. Here, the fluid supply device is configured to lubricate the movement of the cleaning piston in the discharge pipe. Thus, the discharge unit has a component formed as a pipe that can be cleaned by a cleaning piston. This discharge pipe is preferably the main component of the discharge unit and used to output the reaction plastic from the mixing device e.g. into hollow profiles such as window frames. An example for such a construction is given e.g. in DE 10 2015 112 445 A1, the entire content of which is incorporated by reference here, in particular regarding the constructional details of the mixing devices disclosed therein. By lubricating discharge pipes that are cleaned by a cleaning piston, friction between cleaning piston and discharge pipe is reduced. This reduces in turn the wearing of the cleaning piston, and thus the lifetime of the mixing device.

The cleaning piston may leave open a crossover between the mixing chamber and the discharge pipe, if not used to clean the discharge pipe. And the outlet may be located at the crossover between mixing chamber and the discharge pipe. The crossover forms also part of the discharge unit. By this construction the nebulized lubricant can be inserted directly into the crossover between the mixing chamber and the discharge pipe, as close as possible to the end of the cleaning piston in its open or rest position. This ensures not only that the entire discharge pipe and the crossover are lubricated, but also that in particular the region of the discharge pipe into which the cleaning piston moves first is reliably lubricated. In further moving into the discharge pipe the cleaning piston will additionally distribute lubricant on the inner wall of the discharge pipe. In this manner wearing of the cleaning piston due to insufficient lubrication is reliably prevented.

The fluid supply device may be configured to provide the lubricant into the discharge unit while the cleaning piston is moved into the discharge pipe as well as while the cleaning piston is moved out of the discharge pipe. Usually the lubricant will be provided into the discharge pipe when the cleaning piston is removed from the discharge pipe, in order to wet the inner wall of the discharge pipe, e.g. before starting discharge of the reaction plastic. However, it might also be possible to press the gas carrying the nebulized lubricant into the clearance formed between the discharge pipe and the cleaning piston, when the cleaning piston is moved into the discharge pipe. Also, the cleaning piston might be moved so far into the discharge pipe that also the rear part of the cleaning piston can be lubricated. Typically, lubrication will only be carried out for a short time period, when the cleaning piston is moved into the discharge pipe, in order to prevent damaging of the gas supply device and/or the lubricating device due to overpressure and/or to prevent an uneven accumulation of lubricant around the gas outlet.

The mixing device may further comprise a spacer part that separates the cleaning piston from a hydraulic drive used to drive the cleaning piston and whose length is equal to or larger than the stroke length of the cleaning piston. Thus, the mixing device may also be provided with a bell jar. This will ensure that no reaction plastic is moved due to the movements of the cleaning piston into the hydraulic drive of the cleaning piston.

The mixing device may further comprise a control piston arranged within the mixing chamber for controlling flows of the reactive components. Here, an axial direction of the control piston may be oblique, preferably perpendicular, to an axial direction of a discharge pipe of the discharge unit. The outlet may then be arranged opposite to the control piston. The mixing device is therefore formed as an L-shaped mixing head, as described e.g. in DE 10 2015 112 445 A1, whose content is in this regard incorporated by reference here. By providing the outlet of the fluid supply device opposite to the control piston, it is ensured that the discharge pipe is reliably lubricated, in particular at the regions where the reaction plastic is inserted into the discharge pipe.

The mixing device may be configured to mix at least two reactive components, preferably for mixing a polyol and an isocyanate to generate polyurethane, PUR, foam. In particular, the mixing device may be used to fill window frames, refrigerator housings and the like with PUR foam. Since PUR foam is particularly adhesive, usage of the fluid supply device as described above is particularly advantageous in mixing devices producing PUR foam. Of course the same is true for any other reaction plastic that is highly adhesive. The mixing device might also be used to mix resins and respective hardeners. The mixing device might also mix up to 4, 6, 8 or 10 different components and/or mixtures of reactive components and additives.

The lubricant may be a fluid plasticizer or release agent, in particular (C10-C21)alkane sulfonic acid phenyl ester, also known as mesamoll. This ensures that the lubricant provides not only a lubricating effect that reduces the friction inside the discharge unit, or preferably between a discharge pipe and a cleaning piston, but also plasticizes and/or releases remainders of reaction plastics on the inner walls of the discharge unit. So, there is not only a reduction of friction due to the presence of the lubricant, but also due to plastification and/or removal of the reaction plastic adhering to the walls of the discharge unit and/or the cleaning piston.

The fluid supply device may be located at the beginning of the discharge unit, preferably within a head piece of the mixing device and/or opposite to the mixing chamber. The fluid supply device, comprising preferably gas supply device and lubricating device, might therefore be arranged within the housing of the mixing device and adjacent to or opposite to the mixing chamber. In particular, the fluid supply device can be located inside a head piece containing also the mixing chamber and form an integral part of the head piece. This is preferably for saving space. The fluid supply device can also be fixed to an outer wall of the head piece, e.g. opposite to the mixing chamber. This is preferable for retrofitting mixing devices with the fluid supply device.

A method is provided for generating reaction plastics using a mixing device as described above. The method comprises the following steps:
  mixing reactive components in a mixing chamber to generate the reaction plastic;
  discharging the reaction plastic generated in the mixing chamber with a discharge unit connected to the mixing chamber;
  cleaning the discharge pipe from reaction plastic with a cleaning piston that is axially aligned with a discharge pipe of the discharge unit and is moveable into the discharge pipe;
  providing a lubricant into the discharge unit via an outlet, wherein
    a fluid supply device is configured to lubricate the movement of the cleaning piston in the discharge pipe, wherein
    the fluid supply device comprises a gas supply device for providing gas together with the lubricant via the outlet into the discharge unit,
  lubricating the discharge unit through the fluid supply device;
  controlling flows of the reactive components with a control piston arranged within the mixing chamber; wherein
    an axial direction of the control piston is oblique, preferably perpendicular, to an axial direction of a discharge pipe of the discharge unit.

In one embodiment, in the step of providing the lubricant, the lubricant is provided by means of a lubricating device of the fluid supply device, the lubricating device being connected to the gas supply device. The lubricant can be provided by the lubricating device as nebulized lubricant comprised in the gas, the nebulized lubricant being contained in the gas from the gas supply device. In one embodiment, the lubricating device includes an oiler that includes the lubricant. The gas can flow through the oiler to create the nebulized lubricant. The nebulized lubricant can also be referred to as an atomized lubricant.

In one embodiment the outlet may be arranged opposite to the control piston. In another embodiment the outlet can be arranged offset to the control piston. Alternatively the lubrication can be introduced rotated around the axis of the cleaning piston. For this purpose, the control piston can be arranged accordingly.

BRIEF DESCRIPTION OF THE DRAWINGS

The present invention will be described in what follows in more detail based on the accompanying figures. This description is to be understood to be exemplary only, while the present invention is only defined by the claimed subject-matter.

DETAILED DESCRIPTION

The following description is made with respect to a mixing device 100 for reaction plastics constituted as an L-shaped mixing head. It is to be understood that this is not intended to be limiting. The principles described above might just as well be applied to any other type of mixing device. In particular, although all figures are related to an L-shaped mixing head containing a discharge pipe and a cleaning piston, the functioning of the fluid supply device as described above can be used for any type of mixing head, in particular also for linear mixing heads containing no cleaning piston.

Further, although in the following a specific example of a fluid supply device is given that comprises a gas supply device and a lubricating device, this is not intended to be limiting. In principle, any arrangement is possible that allows feeding of fluid, i.e. gaseous or liquid, lubricant directly via an outlet into components of the mixing device that are passed by reaction plastic mixed in the mixing device. The term "directly" means here that the lubricant enters this discharge unit without being fed through other parts of the mixing device such as e.g. a bell jar or a clearance between a cleaning piston and a discharge pipe.

The mixing device 100 shown in FIGS. 1 to 4 comprises a mixing chamber 110 in which different components of a reaction plastic are mixed in a controlled manner to generate the reaction plastic. The reaction plastic might be a polyurethane, PUR, foam that is produced by mixing polyols and isocyanates with each other. However, it is to be understood that also any other reaction plastic consisting of an arbitrary number of components and additives might be mixed in the mixing chamber 110.

The mixing process carried out in the mixing chamber 110 is in principle well known to a skilled person. It is therefore not necessary to discuss in detail the structure and the working process of the mixing chamber 110. Mixing might for example be carried out in a known manner by a control piston 115 in which grooves for a controlled supply of reaction plastic components are provided. The mixing chamber 110 might for example be structured as described in DE 10 2015 112 445 A1.

The generated reaction plastic is output via a discharge unit 120, i.e. one or a plurality of components that are passed by the reaction plastic before being output from the mixing device 100. The discharge unit 120 might comprise at least a discharge pipe as illustrated in the figures. However, also the interior of the mixing chamber or adjacent, downstream regions of the mixing device 100 may be part of the discharge unit 120, while a discharge pipe may be missing. Thus, any part that is contacted by the reaction plastic during discharging of the reaction plastic can be considered a part of the discharge unit 120. In the following description it is assumed that the discharge unit 120 comprises a discharge pipe.

The discharge pipe of the discharge unit 120 may be provided in an oblique angle, preferably orthogonal, to the axial extension of the mixing chamber 110 and the control piston 115. The mixed reaction plastic is output through the discharge pipe. Also the arrangement, structuring and dimensions of the discharge unit 120 and the discharge pipe are well known to a skilled person and need not be described here in detail. The discharge unit 120 might have any form that is suitable for discharging reaction plastic.

Due to the oblique angle between mixing chamber 110 and discharge pipe the reaction plastic components will be post mixed, when they are transferred from the mixing chamber 110 into the discharge pipe. Further, due to the transfer a laminar flow of reaction plastic will result. This allows elongating a nozzle attached to the discharge pipe if compared to linear mixing. L-shaped mixing heads as shown in FIG. 1 are therefore well suited to fill hollow profiles such as window frames, refrigerator housings and the like with reaction plastics, in particular with PUR foams.

In order to clean the discharge unit 120 and in particular the discharge pipe from remnants of reaction plastics or in order to prevent adhesion and consequent plugging of the discharge unit 120 a cleaning piston 130 is provided. The cleaning piston 130 is axially aligned with the discharge pipe, i.e. the discharge pipe and the cleaning piston 130 share the same center line x. The cleaning piston 130 has a circumference that corresponds to the inner circumference of the discharge pipe such as to allow movement of the cleaning piston 130 in a positive fitting manner within the discharge pipe. By this movement reaction plastic contained in the discharge pipe will be pressed out of the discharge pipe.

A clearance is present between discharge pipe and the cleaning piston 130 to allow movement of the cleaning piston 130 in the discharge unit 120. The width of this clearance is in the micron range. By frequent use of the mixing device 100, reaction plastic might adhere to the inner walls of the discharge unit 120 and harden. Thus, hardened reaction plastic will fill the clearance, which leads to enhanced friction between discharge pipe and cleaning piston 130. To remove or minimize this friction lubrication of discharge unit 120 and cleaning piston 130 is provided as will be described below.

Figure 1:
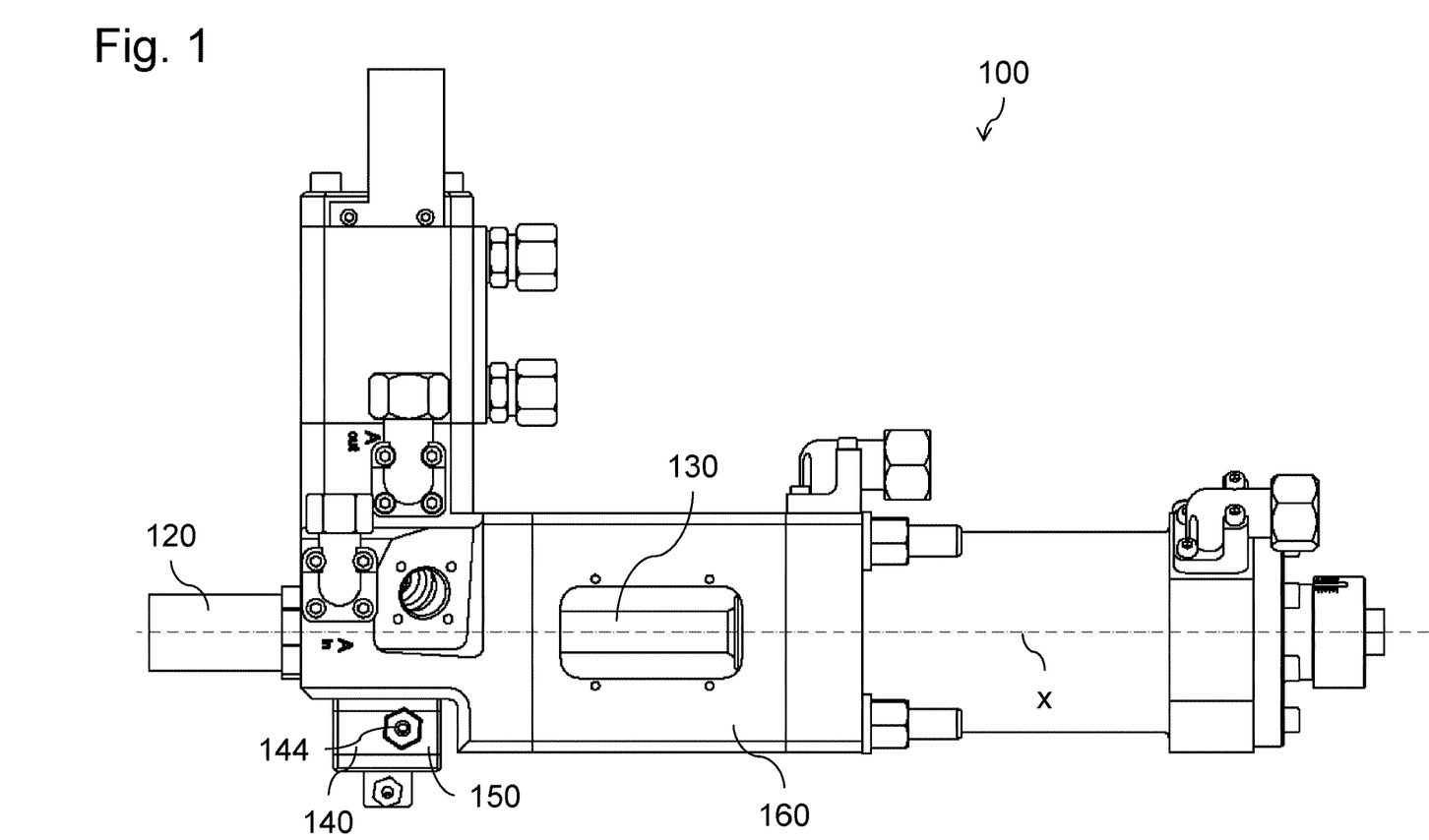
FIG. 1 shows a schematic illustration of a mixing device.

To separate the cleaning piston 130 from a drive of the cleaning piston 130, e.g. a hydraulic drive, a spacer part or bell jar 160 as shown in FIG. 1 may be provided. This spacer part 160 guarantees that reaction plastic dragged by the cleaning piston 130 towards the drive remains in the spacer part 160, but does not reach the drive. This prevents pollution and damaging of the drive. To this end, the spacer part 160 has a length that is equal to or longer than the stroke length of the cleaning piston 130.

The structure of the cleaning piston 130 and the spacer part 160 as well as the driving of the cleaning piston 130 for cleaning the discharge pipe are well known to a skilled person, e.g. from DE 10 2015 112 445 A1. A detailed description thereof will therefore be omitted here.

The mixing device 100 comprises also a fluid supply device comprising a gas supply device 140 and a lubricating device 150 that are connected to each other. The gas supply device 140 is used to provide a gas flow through the discharge unit 120 via an outlet 142 of the fluid supply device that leads into the discharge unit 120. The gas to be streamed through the discharge unit 120 can be provided to an inlet 144 of the gas supply device 140 by a common piping, e.g. through a supply hose or pipe or the like.

The gas supply device 140 is of particular interest if easily inflammable reaction plastics or reaction plastics producing easily inflammable gases are processed with mixing devices 100. In this case an inerting gas like nitrogen, $N_2$, can be supplied via the gas supply device 140 such as to remove oxygen from the discharge unit 120 and components to be filled with the reaction plastic. For example in the processing of pentane driven foams, the discharge unit 120 and its ambience are filled with inerting gas like nitrogen through the gas supply device 140.

The gas supply device 140 is in principle structured as is known for mixing heads that use inerting gas. However, the piping of the gas supply device 140 is connected to the lubricating device 150 in order to wet/oil the supplied gas with a lubricant provided from the lubricating device 150, if needed.

In particular, a duct, e.g. a bypass duct, can be used to guide the gas from the inlet 144 to a reservoir of the lubricant in the lubricating device 150. In the lubricating device 150 the gas streams through or across a reservoir of liquid lubricant and is wetted by droplets of the lubricant that are dragged from the reservoir by the gas flow. In this manner nebulized lubricant consisting of small droplets of lubricant is generated and carried with the gas flow through the outlet 142 of the gas supply device 140. This wetted gas may be considered to be a fluid lubricant provided from fluid supply device via the outlet 142 into the discharge unit 120.

The lubricating device 150 may for example be an oiler, whose functioning is in principle known to a skilled person. Alternatively, the lubricating device 150 generates the nebulized lubricant itself e.g. by vaporizing the lubricant by means of a heating device. Then the gas flow is only led through the lubricating device 150 in order to carry the nebulized lubricant into the discharge unit 120.

In FIGS. 1 to 4 the lubricating device 150 is shown to be located in the same housing as the gas supply device 140, i.e. both devices are comprised in a fluid supply device. However, the lubricating device 150 might also be arranged upstream of the gas supply device 140, i.e. outside the housing shown in FIGS. 1 to 4. Then, a bypass in the gas line is located upstream of the inlet 144 and nebulized lubricant is carried together with the gas flow into the inlet 144 to be distributed by the gas supply device 140 into the discharge pipe 120. This has the advantage that the components of the lubricating device 150, like an oiler, can be provided separated from the mixing device 100, which prevents pollution of the lubricant. Further, spatial separation eases retrofitting of the lubricating device 150 and is very cost sensitive.

Gas supply device 140 and lubricating device 150 might also be provided as fluid supply device within a head piece of the mixing device 100, i.e. as an integral part of the mixing device 100. The fluid supply device might in this case e.g. be located at the beginning of the discharge unit 120 or discharge pipe in a region where the control piston crosses the discharge unit 120. But the fluid supply device might also be located opposite to the mixing chamber 110 and the control piston 115 either as integral part of the head piece of the mixing device 100 or—as shown in the figures—as additional part that can be fixed to the head piece.

If necessary, the duct connecting gas supply device 140 and lubricating device 150 can be provided with a valve, e.g. a pneumatic and/or hydraulic valve. This allows interrupting the gas flow through the lubricating device 150 and therefore operating the gas supply device 140 without lubricating function. In cases where the gas supply is only provided for lubrication such a valve might be unnecessary, since supply of the fluid lubricant can then be controlled by directly controlling the gas flow into or out of the gas supply device 140. In this case also ambient air might be used as the gas.

The lubricant may be any material that leads to a reduction of friction between the discharge unit 120 and the cleaning piston 130 (or, if present, remnants of the reaction plastic thereon), and that does not lead to undesired chemical reactions with the reaction plastic, like enhanced foaming of the reaction plastic. Preferable are materials that are capable of softening or releasing reaction plastic stuck to the discharge unit 120 and/or the cleaning piston 130. In particular, plasticizers usable for plastification of the reaction plastic are preferable, for example (C10-C21)alkane sulfonic acid phenyl ester (also known as mesamoll), DEHP, DOP or the like. Also release agents might be used as lubricant.

Figure 2:
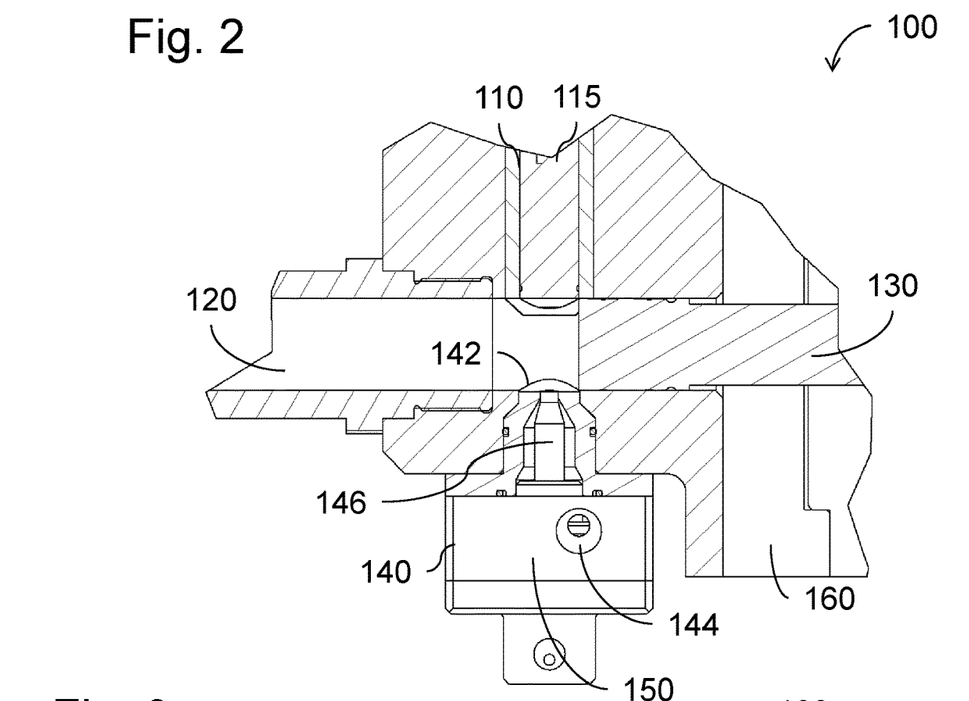
FIG. 2 schematically shows a section through a mixing device in a state with a closed gas supply valve.
Figure 3:
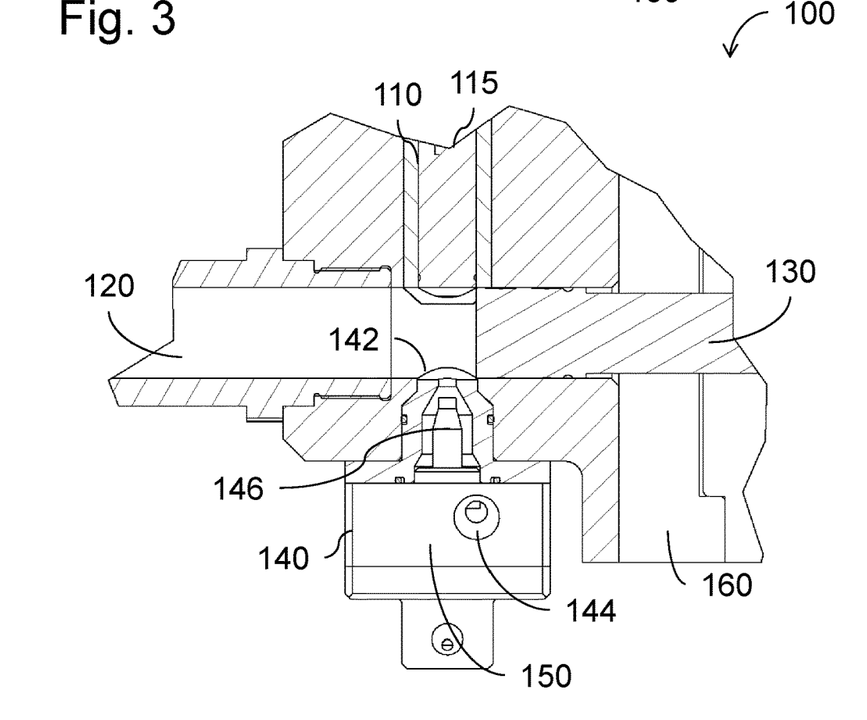
FIG. 3 schematically shows a section through a mixing device in a state with an open gas supply valve.
Figure 4:
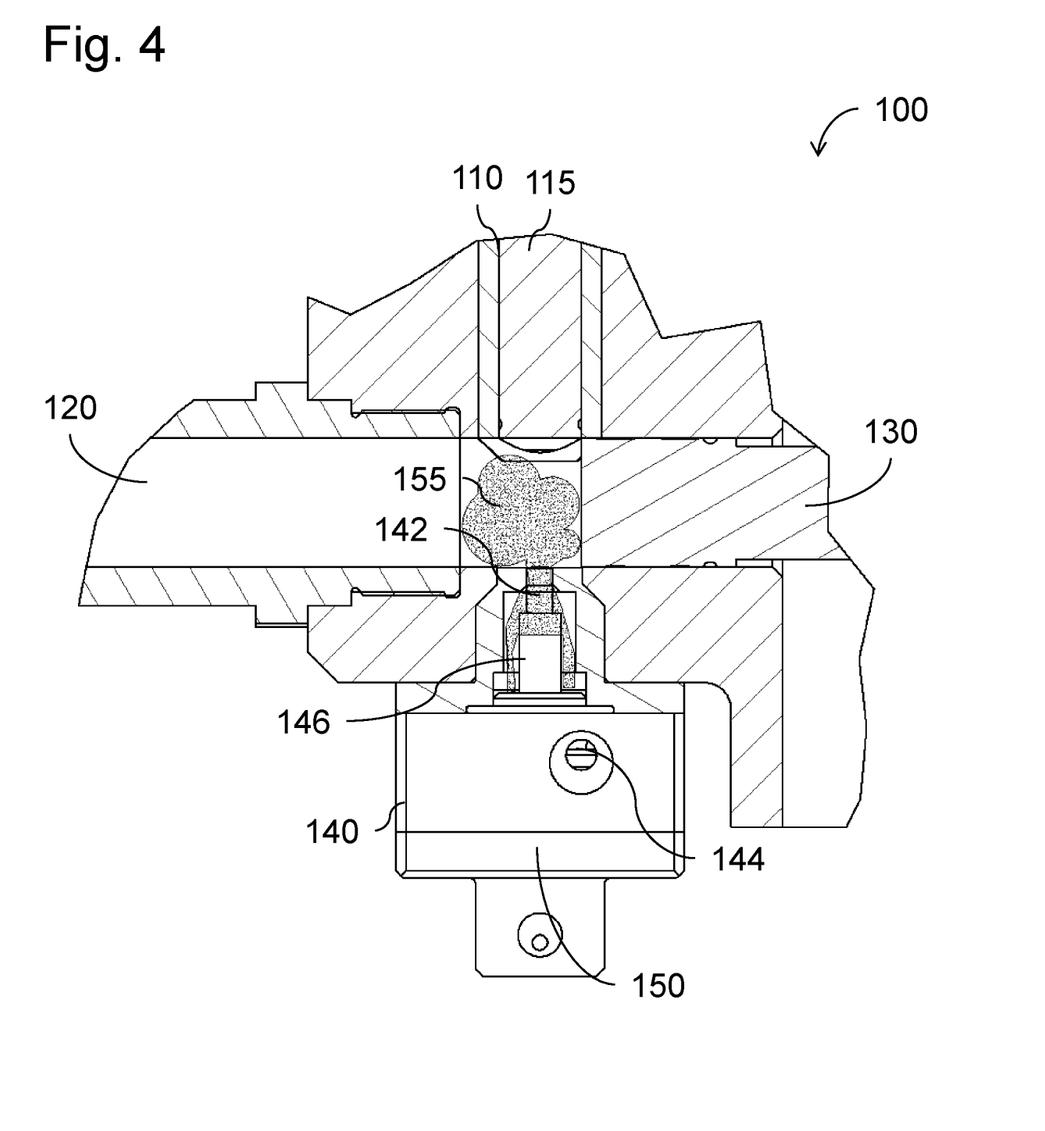
FIG. 4 schematically shows a section through a mixing device into which nebulized lubricant is introduced.

FIGS. 2 to 4 show sections through the mixing device 100 of FIG. 1 in different operational states of the fluid supply device, i.e. of the gas supply device 140 and the lubricating device 150. The sections are taken parallel to the image plane of FIG. 1 and show therefore the arrangement of the mixing chamber 110 including the control piston 115, the discharge pipe 120, the cleaning piston 130 and the gas supply device 140/lubricating device 150.

As can be seen in FIGS. 2 to 4, the outlet 142 of the fluid supply device is positioned in a region of the discharge pipe that forms a crossover with the mixing chamber 110. Differently speaking, the outlet 142 is located in an area of the discharge unit 120 that is only not blocked by the cleaning piston 130, if the cleaning piston 130 is removed so much from the discharge pipe that reaction plastic can be provided from the mixing chamber 110 into the discharge pipe. Since reaction plastic passes the crossover, also the crossover is part of the discharge unit 120.

This ensures that lubrication is carried out in particular in a region that is first contacted by the cleaning piston 130 in a cleaning movement. This has the effect that friction at the beginning of the movement is reduced, which reduces the forces to be applied to the cleaning piston 130 during the entire cleaning movement. Moreover, lubricant distributed in an area close to the head of the cleaning piston 130 will be moved by the cleaning piston 130 through the discharge unit 120, thereby ensuring lubrication of the entire stroke length of the cleaning piston 130. In addition, since the gas carrying the lubricant will stream out of the discharge unit 120, the lubricant is carried along the entire length of the discharge unit 120 and will wet the entire inner wall of the discharge unit 120. Also this ensures that the entire movement of the cleaning piston 130 can be carried out in a lubricated environment. Of course, the outlet 142 can also be located at a different position within the discharge unit 120, if this is considered necessary.

Both, the gas and the lubricant can be provided via hoses or pipes into the fluid supply device, e.g. via inlet 144, or via other (not shown) inlets.

Inside the housing containing gas supply device 140 and lubricating device 150 a connection between the two devices is formed, e.g. by a duct leading gas to the reservoir of the lubricant as described above. This duct can be closable by a valve, e.g. a pneumatic and/or hydraulic valve, to allow supply of pure gas without lubricant as well as supply of gas wetted/oiled with the lubricant.

As described above, lubrication of the gas may be carried out upstream of inlet 144, if the lubricating device 150 is arranged spatially separated from the mixing head or head piece of the mixing device 100. The duct branching from the main line of the gas supply device 140 and the corresponding valve are then also located upstream of inlet 144.

Supply of the gas may be controlled via a valve containing a piston 146 for opening and closing the gas supply device 140. The valve might be a hydraulic or pneumatic valve. The valve might also open via gas pressure applied to the valve, while it is closed hydraulically. During discharge of reaction plastic the piston 146 is closed to prevent gas from mixing with the reaction plastic, which would lead to deterioration of the quality of the reaction plastic. This state is illustrated in FIG. 2 which shows the shut piston 146.

By opening the piston 146 as shown in FIG. 3 gas can stream into the discharge unit 120. This might be done for cleaning the discharge unit 120 with pressurized gas, e.g. ambient air, or in order to inert discharge unit 120 and components to be filled with easily inflammable reaction plastics.

As finally shown in FIG. 4 while the piston 146 is open, the valve connecting the gas supply with the lubricating device 150 can be opened to cause gas to stream through the lubricating device 150 and carry nebulized lubricant 155 into the discharge pipe 120. This might be achieved by connecting an in principle well known oiler containing the lubricant via a valve controlled duct or hose to the gas inlet 144. For example, a bypass duct bypassing the gas ducts of the gas supply device 140 and leading through the lubricating device 150 might be provided.

The gas streams over the lubricant that is contained in the oiler, drags the lubricant with it, and produces in this manner the nebulized lubricant 155. Due to the gas flow the nebulized lubricant 155 is carried across the entire inner wall of the discharge unit 120, which is therefore wetted by the nebulized lubricant 155. In this process, the gas flow is adjusted such that the amount of lubricant carried with the gas is sufficient to wet the inner wall of the discharge pipe 120, but does not form puddles that might lead to a deterioration of the discharged reaction plastic.

In this manner the lubricant is supplied exactly at the position at which it is needed most, i.e. at the inner wall of the discharge unit 120, but not at the bell jar side of the cleaning piston 130. This can for example be done before discharging reaction plastic, in order to prevent adhesion of the reaction plastic to the inner wall of the discharge unit 120. In addition, it should be noted that since the wetted gas can also be supplied when the cleaning piston 130 is moved into the discharge pipe, the entire outer surface of the cleaning piston 130 can be lubricated in principle. Moreover, arranging an oiler as additional lubricating device 150 connected to the gas supply 140 is easy from a constructional point of view and very cost and maintenance sensitive in comparison to lubricating systems used according to the prior art. Further, letting the gas flow carry the nebulized lubricant allows a reliable dosage of the lubricant, since the amount of lubricant can basically be controlled via the parameters of the gas flow. Alternatively, a gaseous lubricant might also be provided from the fluid supply device from outside to the outlet 142 to lubricate the discharge unit 120.

As described above, the present invention provides a cost sensitive, reliable, and easily implementable solution for the problem of how to provide a lubricant into a discharge unit 120 of a mixing device 100 for the production of reaction plastic. In this manner, the lifetime of a cleaning piston 130 used to clean a discharge pipe of the discharge unit 120 can be enhanced, which enhances in turn the lifetime of the entire mixing device 100. Also, by lubricating the discharge unit 120 a flow pattern of the reaction plastic during discharge will improve, irrespective of the presence of a cleaning piston 130.

REFERENCE SIGN LIST

100 Mixing device
110 Mixing chamber
115 Control piston
120 Discharge unit
130 Cleaning piston
140 Gas supply device
142 Outlet of gas supply device
144 Inlet of gas supply device
146 Piston for opening and closing the gas supply device
150 Lubricating device
155 Nebulized lubricant
160 Spacer part/bell jar

The invention claimed is:

1. A mixing device for generating reaction plastic, the mixing device comprising:
   a mixing chamber configured to mix reactive components to generate the reaction plastic;
   a discharge unit, including a discharge pipe, connected to the mixing chamber and configured to discharge the reaction plastic generated in the mixing chamber;
   a cleaning piston that is axially aligned with the discharge pipe of the discharge unit and is moveable into the discharge pipe to clean reaction plastic from the discharge pipe;
   a fluid supply device configured to provide a lubricant into the discharge unit via an outlet in order to lubricate the discharge unit, wherein
   the fluid supply device is configured to lubricate movement of the cleaning piston in the discharge pipe, wherein
   the fluid supply device comprises a gas supply device configured to provide gas together with the lubricant via the outlet into the discharge unit, wherein the fluid supply device is configured to provide the lubricant into the discharge unit while the cleaning piston is moved into the discharge pipe and while the cleaning piston is moved out of the discharge pipe,
   a control piston, arranged within the mixing chamber, configured to control flows of the reactive components, wherein
   an axial direction of the control piston is oblique-to an axial direction of the discharge pipe of the discharge unit;
   wherein the fluid supply device comprises a lubricating device configured to provide the lubricant, the lubricating device being connected to the gas supply device, wherein the lubricating device comprises at least one of a pneumatic or hydraulic valve and, when the cleaning piston is not cleaning the discharge pipe, the cleaning piston is configured to leave open a crossover between the mixing chamber and the discharge pipe; and
   the outlet is located at the crossover between the mixing chamber and the discharge pipe.

2. The mixing device of claim 1, wherein the gas is an inert gas.

3. The mixing device of claim 1, wherein the fluid supply device is configured to provide the lubricant from the lubricating device as nebulized lubricant in the gas from the gas supply device.

4. The mixing device of claim 3, wherein the lubricating device comprises an oiler to provide the lubricant, through which the gas flows to generate the nebulized lubricant.

5. The mixing device of claim 1, further comprising:
   a spacer part that separates the cleaning piston from a hydraulic drive used to drive the cleaning piston, the spacer part having a length equal to or larger than a stroke length of the cleaning piston.

6. The mixing device of claim 1, wherein the outlet is arranged opposite to the control piston.

7. The mixing device of claim 1, wherein the mixing device is configured to mix at least two reactive components, polyol and an isocyanate, to generate polyurethane foam.

8. The mixing device of claim 1, wherein the lubricant is a fluid plasticizer or release agent.

9. The mixing device of claim 1, wherein the fluid supply device is located at the front of the discharge unit, within at least one of a head piece of the mixing device or opposite to the mixing chamber.

10. The mixing device of claim 1, wherein the gas is nitrogen.

11. The mixing device of claim 1, wherein the lubricant is alkane sulfonic acid phenyl ester.

12. The mixing device of claim 2, wherein the fluid supply device is configured to provide the lubricant from the lubricating device as nebulized lubricant in the gas from the gas supply device.

13. The mixing device of claim 2, further comprising:
a spacer part that separates the cleaning piston from a hydraulic drive used to drive the cleaning piston, the spacer part having a length equal to or larger than a stroke length of the cleaning piston.

14. The mixing device of claim 2, wherein the mixing device is configured to mix at least two reactive components, polyol and an isocyanate, to generate polyurethane foam.

15. A method for generating reaction plastic using a mixing device, the method comprising:
mixing reactive components in a mixing chamber to generate the reaction plastic;
discharging the reaction plastic generated in the mixing chamber with a discharge unit connected to the mixing chamber;
cleaning reaction plastic from a discharge pipe of the discharge unit with a cleaning piston that is axially aligned with the discharge pipe of the discharge unit and is moveable into the discharge pipe;
lubricating the discharge unit through a fluid supply device by providing a lubricant into the discharge unit via an outlet, wherein
the fluid supply device is configured to lubricate the movement of the cleaning piston in the discharge pipe, and
the fluid supply device comprises a gas supply device for providing gas together with the lubricant via the outlet into the discharge unit; and
controlling flows of the reactive components with a control piston arranged within the mixing chamber, wherein an axial direction of movement of the control piston is oblique-to an axial direction of the discharge pipe of the discharge unit;
wherein the fluid supply device comprises a lubricating device configured to provide the lubricant, the lubricating device being connected to the gas supply device, wherein the lubricating device comprises at least one of a pneumatic or hydraulic valve and, when the cleaning piston is not cleaning the discharge pipe, the cleaning piston is configured to leave open a crossover between the mixing chamber and the discharge pipe; and
the outlet is located at the crossover between the mixing chamber and the discharge pipe.

16. The method of claim 15, wherein the lubricant is provided by a lubricating device of the fluid supply device, the lubricating device being connected to the gas supply device and wherein the lubricant is provided by the lubricating device as nebulized lubricant in the gas, the nebulized lubricant being contained in the gas from the gas supply device, wherein the lubricating device includes an oiler that provides the lubricant, and is configured for the gas to flow through the oiler to create the nebulized lubricant.

* * * * *